UNITED STATES PATENT OFFICE.

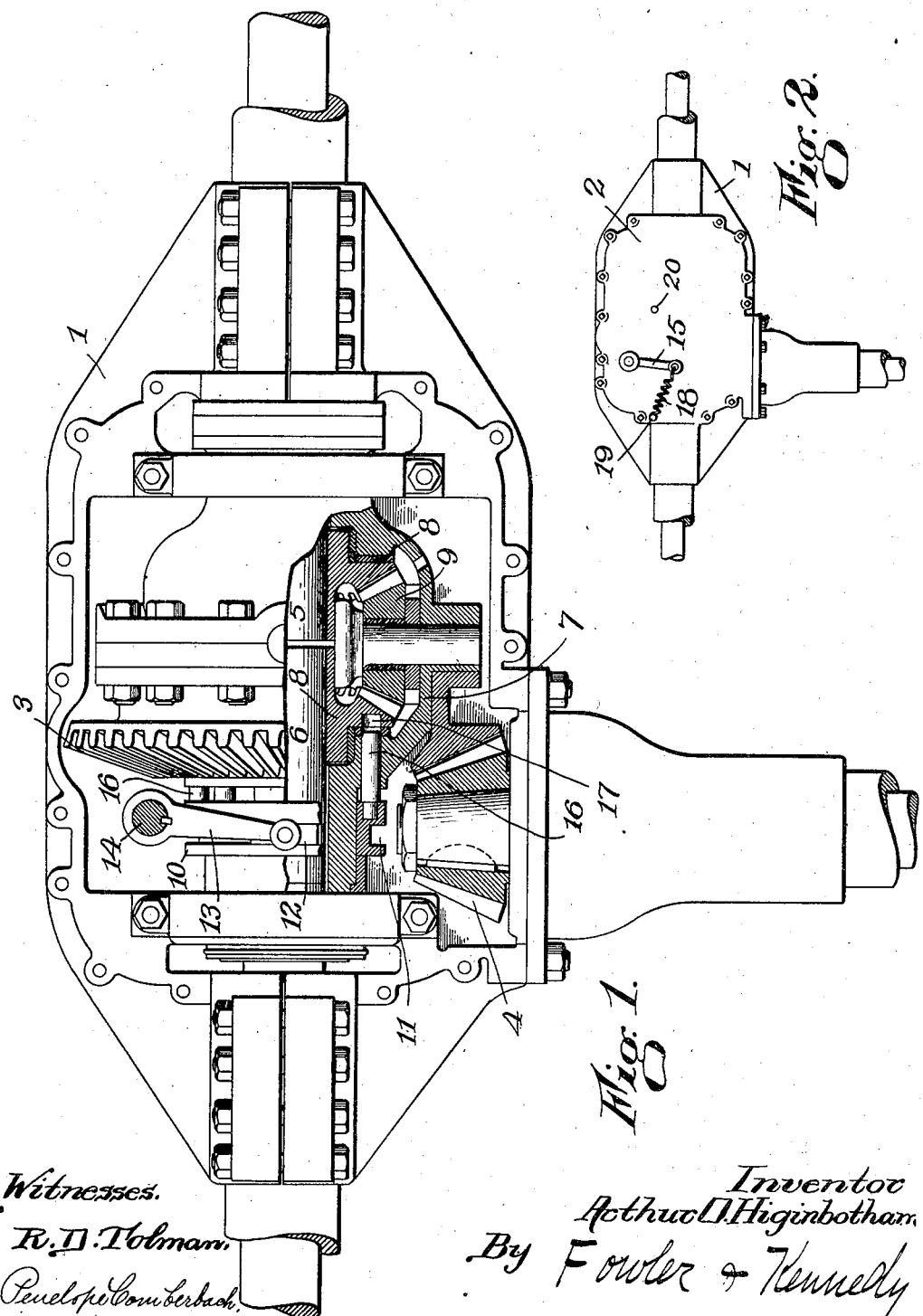

ARTHUR O. HIGINBOTHAM, OF WORCESTER, MASSACHUSETTS, ASSIGNOR TO CHARLES B. FOSTER AND COMPANY, A COPARTNERSHIP CONSISTING OF CHARLES B. FOSTER, ARTHUR O. HIGINBOTHAM, AND JEROME R. GEORGE, ALL OF WORCESTER, MASSACHUSETTS.

LOCKING DEVICE FOR DIFFERENTIAL MECHANISM.

1,193,017. Specification of Letters Patent. Patented Aug. 1, 1916.

Application filed August 5, 1914. Serial No. 855,285.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in Locking Devices for Differential Mechanism, of which the following, taken in connection with the accompanying drawings, is a specification.

The present invention relates to motor vehicles, and in particular, to improvements in the driving gear thereof.

The usual "differential" gearing, employed for the purpose of permitting one of the rear driving wheels of a motor vehicle to rotate faster or slower than the other driving wheel, as the conditions of road travel demand, is sometimes equipped with a locking device by means of which said wheels may be constrained to move in unison, if desired.

The present invention aims to provide means by which the operation of locking is relieved of the necessity for manual intervention in effecting the movement of the locking device into operative position, and its subsequent movement into inoperative position.

The construction and arrangement of parts by which my invention is attained is fully set forth in the following description and the claim annexed thereto, reference being had to the accompanying drawings, in which—

Figure 1 is an interior view, partly in section, of a "differential" gearing equipped with a locking device, and Fig. 2 is an exterior view of the casing for said gearing, showing the operating means for the locking device.

Like reference characters refer to like parts in both figures.

The "differential" gearing shown in the drawings is of the usual type, and is contained within a supporting casing 1, having a detachable cover 2 which is shown removed in Fig. 1. The usual bevel gear 3 is driven from the tail or propeller shaft of the vehicle by means of an intermeshing bevel pinion 4, and the rotation of said bevel gear 3 is adapted to be imparted, in the usual manner, to the jack shafts 5 and 6, which are operatively connected to the driving wheels of the vehicle, not shown. A housing 7, constituting the housing proper of the "differential" gearing, is secured to and is rotatable with the bevel gear 3, said housing having journaled therein the sun gears 8, 8 and the sun gear pinions 9, 9 by means of which the rotation of said housing is imparted to said jack shafts, to which the sun gears 8, 8 are splined. The construction shown in the drawings, and briefly referred to above, constitutes an ordinary form of "differential" gearing, well known to those skilled in the art to which this invention appertains and hence a detailed description of the same is deemed unnecessary.

A sleeve 10 surrounds the housing 7 and is movable longitudinally with respect thereto. To this end the sleeve 10 has a peripheral groove 11 within which is disposed, at diametrically opposite points, a pair of shoes 12, 12, only one of which is shown in Fig. 1. Said shoes 12, 12 are pivotally mounted on the ends of arms 13, 13, constituting a yoke, which is keyed or otherwise secured to a vertically disposed rocking shaft 14. The latter extends through the cover 2 of the casing 1 and carries, on the outside of said cover, an arm 15 by the swinging movement of which the longitudinal movement of the sleeve 10 is accomplished.

One edge of the sleeve 10 carries an annular series of pins 16 which extend through correspondingly arranged holes in the housing 7 and, in the position of the parts shown in Fig. 1, terminate just short of the rear face of sun gear 8 on shaft 6. When the sleeve 10 is moved to the right in said figure, the ends of said pins enter the correspondingly arranged recesses 17 in the rear face of said sun gear, and the housing 7 and the gears 8, 8 and pinions 9, 9 are thereby locked together to rotate in unison. Under such conditions, the shafts 5 and 6 are constrained to rotate in unison, no "differential" action being possible.

In order to effect the ready locking and unlocking of the device, the free end of arm 15 has attached thereto a spring 18, the other end of which is adapted to be secured to one of a pair of fixed projections 19, 20 on the cover 2. In the normal operation of the vehicle, the spring is secured to the projection 19, and serves to hold the sleeve 10 at the limit of its movement to the left in Fig. 1, as shown in said figure, the locking device being then inoperative. When the operator wishes for any reason to dispense with the "differential" operation of the gearing, he has simply to hook the end of the spring over the projection 20, whereupon the tension of said spring is exerted to draw the pins 16 into the recesses 17 as soon as the registration of said recesses with said pins is established by relative movement of the shafts 5 and 6. A multiplicity of pins 16, equally spaced, are provided, and the recesses 17 are of the same number and arrangement, so that only a slight relative movement is required to establish the desired registration. When it is desired to reëstablish the "differential" action of the gearing, the operator simply hooks the spring onto the other projection 19 whereupon, as soon as the road conditions are favorable to an equalization of the resistance on the two driving wheels of the vehicle, the pins 16 will be withdrawn from the recesses 17.

I claim,

The combination with the differential gearing of a motor vehicle, of a casing therefor, means for locking said gearing, an operating member for said locking means on the exterior of said casing, and a spring attached at one end to said operating member and adapted to be attached at its other end to one or the other of a pair of fixed points on said casing whereby the movement of said locking means into operative or inoperative position is effected by the force of said spring when the condition of the gearing is favorable to such movement.

Dated this first day of August, 1914.

ARTHUR O. HIGINBOTHAM.

Witnesses:
PENELOPE COMBERBACH.
NELLIE WHALEN.

Copies of this patent may be obtained for five cents each, by addressing the "Commissioner of Patents, Washington, D. C."